(12) United States Patent
Blank et al.

(10) Patent No.: US 6,433,278 B1
(45) Date of Patent: Aug. 13, 2002

(54) ATTACHMENT DEVICE WITH CAP

(75) Inventors: Eckhard Blank, Wolfsburg; Schrötter Klaus-Dieter, Lang-Göns; Reimar Saltenberger, Niederwetz; Joachim Schneider, Ehringshausen-Katzenfurt, all of (DE)

(73) Assignee: Emhart LLC, Newark, DE (US)

( * ) Notice: Subject to any disclaimer, the term of this patent is extended or adjusted under 35 U.S.C. 154(b) by 1 day.

(21) Appl. No.: 09/710,474

(22) Filed: Nov. 9, 2000

(30) Foreign Application Priority Data

Nov. 11, 1999 (DE) .......................... 199 54 354

(51) Int. Cl.⁷ ................................ H02G 3/18
(52) U.S. Cl. ................ 174/65 R; 174/65 G; 16/2.2; 248/56; 439/604
(58) Field of Search ............... 174/65 R, 65 G, 174/135, 152 G, 153 G; 16/2.1, 2.2; 248/56; 439/604

(56) References Cited

U.S. PATENT DOCUMENTS

| | | | | |
|---|---|---|---|---|
| 4,243,834 A | * | 1/1981 | Logioco ................. | 174/38 |
| 5,090,644 A | * | 2/1992 | Lenker .................. | 248/56 |
| 5,442,133 A | | 8/1995 | Arnold et al. | |
| 6,061,870 A | * | 5/2000 | Dodge et al. ............ | 16/2.1 |
| 6,233,782 B1 | * | 5/2001 | Regele et al. ........... | 16/2.1 |
| 6,248,952 B1 | * | 6/2001 | Reeves et al. ........... | 174/65 R |
| 6,331,674 B1 | * | 12/2001 | Zolock et al. ........... | 174/60 |

FOREIGN PATENT DOCUMENTS

EP 0487365 of 1994

* cited by examiner

*Primary Examiner*—Dean A. Reichard
*Assistant Examiner*—Dhiru R Patel
(74) *Attorney, Agent, or Firm*—Edward D. Murphy

(57) ABSTRACT

An attachment device for the fastening or connecting of electrical conductors to a unit in a higher position. The attachment device has a sleeve-shaped contact piece (1) and a cap (9) connected thereto. The contact piece (1) is connected by positive material locking to the unit in a higher position with the connecting region (2). The contact piece (1) at least near the attachment face (6) has an external contour that corresponds to a polygon in cross-section. The cap (9) at least partially closes the orifice (4) in the vicinity of the connecting region (2).

11 Claims, 2 Drawing Sheets

ATTACHMENT DEVICE WITH CAP

BACKGROUND OF THE INVENTION

The invention relates to an attachment device with a contact piece that can be connected on the face and with positive material locking to a unit in a higher position and with a cap.

The invention serves as a fastening and connecting facility and is used in particular in automobile construction as a point of attachment preferably for a ground contact.

The necessity of grounding electrical systems, particularly in automobiles and the like is sufficiently known. According to U.S. Pat. No. 5,442,133 there is a facility for securing an ground contact of this kind in that a weld stud with an outer thread is fastened to a car body or another component and thus serves as a fastening and connecting facility for an electrical conductor. The weld stud has a flange that serves as a contact face. The functionality of the contact face and the outer thread of the weld stud must be guaranteed by the welding process and subsequent lacquering procedures.

The welding process threatens the functionality of the attachment, as, in particular in the arc welding process welding splashes arise. These can stick to the thread and make tightening and loosening of a corresponding nut difficult. Further, according to EP 0 487 365, the fastening of an electrical attachment device by means of resistance welding is known.

The welding process has to be carried out before the car body sheet is lacquered. The lacquer at the connecting point between the attachment device and the car body sheet prevents a well-formed weld seam and in this way reduces the life span of the positive material locking connection.

For these reasons measures are taken which protect the outer thread and the contact face on the weld stud from welding and lacquer splashes. A protective measure of this kind consists of a flange nut being mounted on the weld stud before the welding process. So that the whole outer thread is protected the flange nut is preferably designed as a cap nut.

The flange nut is mounted on the contact face at high initial tension. If the initial tension is too low there is a danger that, owing to the heat occurring during the welding process, the connection between the nut and the weld stud becomes detached. In subsequent lacquering procedures lacquer can accumulate between nut and weld stud owing to capillary action. This can lead to the contact face being covered with an insulating layer.

The weld stud offers a facility for fastening by means of a correspondingly designed connection piece on the electrical conductor and the flange nut. Mounting the electrical conductor can only take place from the direction in which the weld stud extends. The outer thread on the weld stud must be of a certain length, so that secure clamping of a cable by a nut is guaranteed. Owing to the resulting extension of the weld stud out of the plane of the car body sheet, sufficient space must be provided on the mounting side for fastening the ground contact.

The weld stud is preferably welded onto thin car body sheets by the stud welding process. To fasten the electrical conductor, a sufficient torsion must be generated when the flange nut is tightened, so that a secure electrical contact is possible. Mounting the flange nut onto the welded-on weld stud can cause the connection between weld stud and car body sheet to become detached or the car body sheet to be bent, owing to the torsion required.

SUMMARY OF THE INVENTION

The object of the present invention is to make available an attachment device that represents effective protection against contamination of the contact face and additionally withstands a higher torsional stress.

An attachment device has a contact piece, which is connectable on the face and with positive material locking to a unit in a higher position, and a cap, wherein the contact piece is designed as sleeve-shaped and the cap is arranged in such a way that the cap at least partially closes an orifice of the contact piece in the vicinity of a connecting region. "Arranged" in this context means that the cap is connected directly or indirectly to the contact piece. The cap in this way prevents welding splashes reaching the inside of the orifice. In subsequent lacquering procedures the cap effectively prevents the penetration of lacquer particles into the inside of the orifice, which can result in insulation of the contact face.

The sleeve-shaped design of the contact piece allows fastening of additional attachment units on both sides. For this purpose the cap can be removed after the lacquering procedures. The sleeve-shaped design of the contact piece in this way allows two possibilities of access to the through aperture. With a corresponding orifice in the car body sheet the ground contact can thus also be fitted from the side of the car body sheet remote from the contact piece with the weld seam.

The sleeve-shaped configuration of the contact piece allows good heat conduction during the welding process and leads to a lower thermal stress of the car body sheet. The lower thermal stress allows larger external diameters of the contact piece and thus a larger connecting region to be used. In this way the attachment device withstands a higher torsional stress.

Owing to the sort of thermal load on the attachment device that arises during positive material locking of this device to the higher unit, it is advantageous to produce the cap from a heatproof material. With a view to the area of application, in particular the fastening of a ground cable, it makes sense to produce the cap from an electrically non-conducting material, to allow controlled further conduction of electrical charge. Additionally, in this way it is avoided that the arc develops towards the cap during the welding process and damages it. For these reasons a cap of plastics material is to be recommended, corresponding to an advantageous further development.

After the cap has been fastened to the contact piece, the cap preferably projects beyond the connecting region of the contact piece. In this way the cap can be used for centering the attachment device during the welding process. Correspondingly designed positioning aids on the car body sheet support self-centring. This is particularly suitable for automated manufacture, as found in automobile construction.

If the possibility of fastening a ground contact on both sides can be dispensed with, the contact piece can be designed as a sheath, according to another further development. An embodiment of such a kind allows the fastening of a ground contact, after removing the cap, only from the side of the car body sheet remote from the weld seam. With this embodiment the attachment face for an ground contact is threatened by contamination such as welding or lacquer splashes only from one side, owing to the lack of a through aperture. The cap alone thus offers effective protection of the attachment face.

For a secure welding process in automated manufacture structural restrictions have to be taken into consideration.

For example, it must be guaranteed that the contact piece is always taken up by the welding robot in a defined orientation. This ensures that the contact piece is connected to the metal sheet with its connecting region. For this purpose the contact piece comprises a reduced cross-section opposed to the connecting region in the vicinity of the attachment face compared with other regions. This reduced cross-section ensures that the contact piece can be taken up by the welding device at a pre-determined orientation.

The contact piece with its orifice offers the facility of fastening a ground contact. It is particularly advantageous, according to an advantageous further development, that at least a partial region of the outer face of a channel adjoining the orifice is designed as an inner thread. The inner thread in conjunction with a corresponding screw represents a detachable and secure fastening of the ground contact. With a correspondingly designed cable lug on the ground cable the cable can be clamped to the metal attachment face of the contact piece with the screw. In this way a relatively large area which is particularly suitable for the further conduction of electrical charge is made available.

According to yet another advantageous further development the object of the invention is characterised in that the contact piece at least near the attachment face has an outer contour which corresponds to a polygon in cross-section. This specially designed cross-section in conjunction with a correspondingly designed cable lug represents an anti-rotation unit that prevents rotation of the electrical conductor during fastening with a screw. Rotation of the electrical conductor round the contact piece can result in the electrical conductor becoming detached from other fastening points. A rotation of this kind can be prevented in that the cable lug has raised areas, the arrangement of which is adapted to the polygonal cross-section of the contact piece. In this way positive locking is achieved between cable lug and contact piece.

According to yet another advantageous further development it is proposed that the contact piece at least near the connecting region comprises a welded edge. The welded edge is to be designed in such a way that it is suitable for the welding process used for fastening the contact piece on the car body sheet.

According to yet another advantageous embodiment of the invention it is proposed that the cap is fastened to the contact piece from inside. In this way no additional faces have to be provided on the contact piece to be placed onto the metal sheet during the welding process. A further advantage is that the fastening of the cap on the contact piece is protected against external environmental influences owing to the surrounding outer face.

The connection between cap and contact piece is preferably designed as detachable. This embodiment facilitates the fastening of the ground contact from the side of the metal sheet remote from the weld seam. The detachable connection is preferably to be designed as a snap connection.

Corresponding to an advantageous further development the snap connection is designed in such a way that the contact piece on the outer face of the orifice comprises a groove and the cap has a corresponding collar, the collar of the cap engaging in the groove. The groove and the collar are preferably to be designed as peripheral. If a collar designed in such a way is located in a peripheral groove and in this way differently orientated contact faces arise between contact piece and cap, this snap connection acts similarly to a labyrinth seal. This embodiment of the snap connection thus represents an effective protection against lacquer splashes.

As collar and groove are designed as peripheral, during joining only the axial orientation of contact piece and cap is significant.

According to yet another advantageous further development the object of the invention is characterised in that the attachment device comprises a stud which is connected to the contact piece. The stud has two end regions, wherein one end region projects beyond the attachment face of the contact piece and the other end region is connected to the cap. The end of the stud that is connected to the cap is preferably designed in such a way that the cap can be fastened on the outer face of the stud. The end region of the stud which projects beyond the attachment face of the contact piece is preferably designed in such a way that it closes the orifice of the contact piece near the attachment face and comprises a flange which serves to fasten the electrical conductor on the attachment face of the contact piece.

According to yet another configuration it is proposed that the cap fastened to the stud contacts the contact face in such a way that it at least partially closes the orifice near the connecting region. Preferably the cap comprises raised areas on the side remote from the stud, which contact the outer face of the channel of the contact piece. Preferably this raised area is designed as a peripheral collar.

According to yet another configuration it is proposed that the stud has a head, which is adjacent to the attachment face, on the end which protrudes beyond the attachment face. The stud is connected to the contact piece before the lacquering procedures in such a way that the head of the stud is located on the attachment face of the contact piece. In this way electrically insulating lacquer splashes are prevented from reaching the attachment face. To fasten the electrical conductor after the lacquering process the stud is detached.

Further details and advantages of the device according to the invention are explained with reference to the embodiments illustrated in the drawings.

BRIEF DESCRIPTION OF THE ACCOMPANYING DRAWINGS

DETAILED DESCRIPTION OF THE PREFERRED EMBODIMENTS

Figure 2:
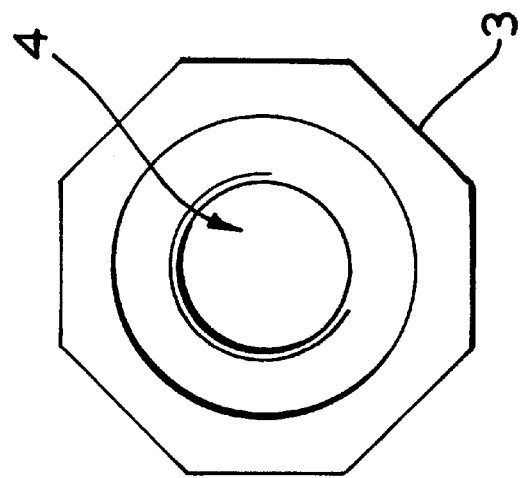
FIG. 2 shows a view from below of the contact piece designed as sleeve-shaped.
Figure 1:
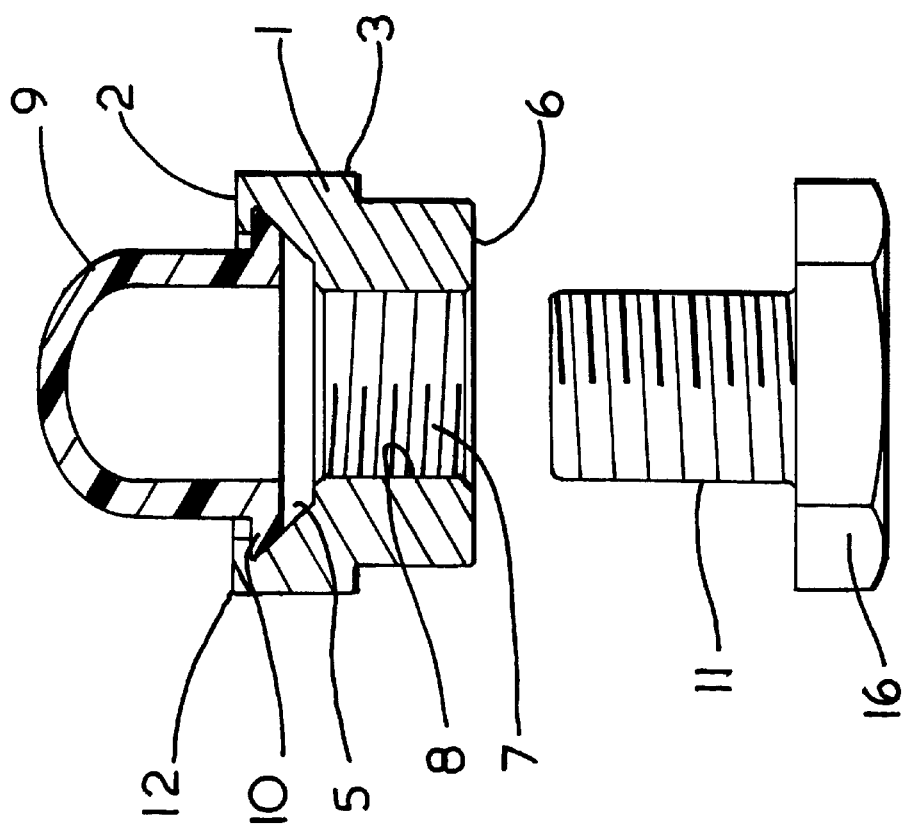
FIG. 1 shows a sleeve-shaped embodiment of the contact piece in cross-section with a rotationally symmetrical plastics material cap, snap connection and screw.

The contact piece 1 of the attachment device is connected on the face and with positive material locking on and with the connecting region 2 to a higher unit. The higher unit preferably represents a car body sheet to which a cable is to be fastened. The positive material locking is produced according to the arc-stud welding process.

The contact piece 1 is designed as sleeve-shaped. Opposed to the connecting region 2, the contact piece 1 comprises an attachment face 6. The attachment face 6 allows the fastening of an electrical conductor that ensures controlled further conduction of electrical charge. Fastening of the electrical conductor takes place in this embodiment by clamping an electrical conductor. The clamping preferably takes place detachably. For this reason the contact piece 1 in the vicinity of the attachment face 6 has an inner thread 8 which is designed on the outer face of a channel 7. Fastening of the electrical conductor takes place with a stud 11, which is preferably designed as a screw.

The contact piece 1 at least near the attachment face 6 comprises an external contour 3 that corresponds to a polygon in cross-section, as FIG. 2 shows. The embodiment illustrated has an octagonal cross-section. This special cross-section with corresponding devices on the electrical conductor forms an anti-rotation unit that prevents rotation of the electrical conductor when the screw is tightened. For this purpose cable lug and contact piece 1 enter into a positive locking connection. Corresponding to the number of side faces of the polygon of the external contour 3 and the number of positive locking raised areas on the cable lug, there are various possibilities for the orientation of the electrical conductor during fastening thereof.

Owing to the preferred area of application of this attachment device in automobile construction, design of the external geometry is to be undertaken with automated manufacture in mind. For this reason the contact piece 1 has a reduced cross-section in the vicinity of the attachment face 6 compared with other regions. This reduced cross-section is designed as circular and allows controlled taking up and fixing of the contact piece 1 by a welding robot which undertakes the positive material locking connection to the unit in a higher position. Additionally, the cap 9 of the attachment device is designed in such a way that, after being fastened to the contact piece 1, it projects beyond the connecting region 2. With corresponding positioning aids, here a positioning aperture, on the car body sheet, self-centring takes place by means of the cap 9 during fastening of the contact piece 1.

For a secure fastening process of the contact piece 1 to a metal sheet, a correspondingly designed connecting region 2 is to be provided, which is suitable for the arc welding process. The embodiment illustrated allows this in that the fastening of the cap 9 to the contact piece 1 is fitted inside the contact piece 1. The fastening of the cap 9 on the contact piece is preferably to be designed as detachable, to allow fixing of the electrical conductor on both sides.

The embodiment illustrated is characterised in that the connection of the cap 9 to the contact piece 1 is designed as a snap connection. The advantages of a snap connection are the relatively simple geometry which the elements to be connected need to comprise and the small amount of time required to produce or detach this connection.

The contact piece 1 of the embodiment illustrated comprises for this purpose a groove 5 in the outer face of the channel 7. The groove in this embodiment is peripheral and designed as orientated radially outwards. The cap 9 has a corresponding collar 10, which in this embodiment is also designed as peripheral. The snap connection arises in that the collar 10 of the cap 9 engages in the groove 5 of the contact piece 1. The combination of the peripheral groove 5 and the corresponding collar 10 in the joined state has the advantage that the snap connection represents an effective protection against lacquer splashes.

The contact piece 1 is assembled with the cap 9 and the stud 11 and then fastened to the bodywork as a structural unit by the arc-stud welding process.

Figure 3:
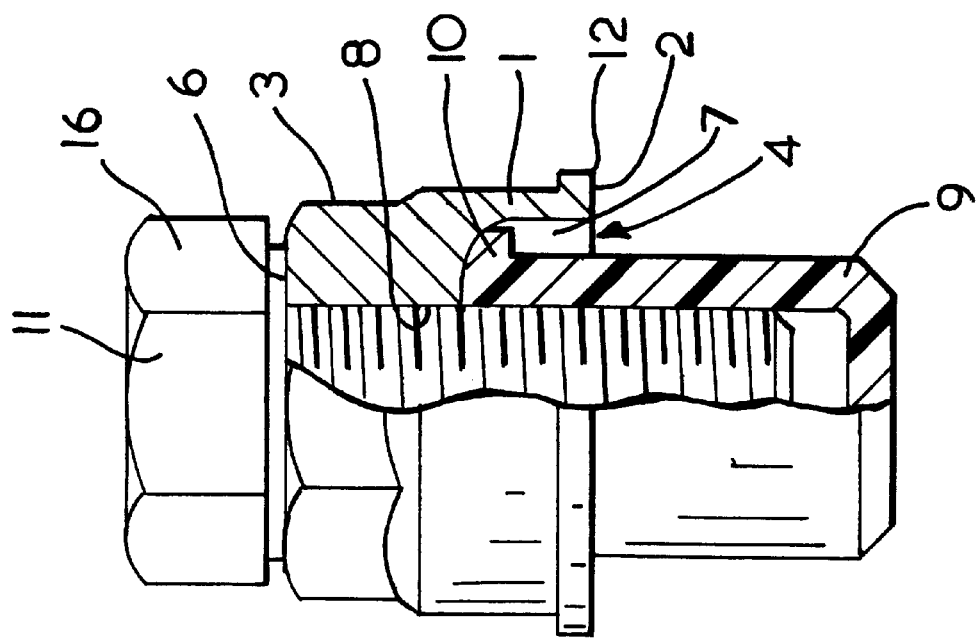
FIG. 3 shows a further sleeve-shaped embodiment of the contact piece with plastics material cap and screw.

FIG. 3 shows a further embodiment of the attachment device with a cap and a stud. The contact piece 1 is designed as sleeve-shaped and connectable on the face to a unit in a higher position, not illustrated. The contact piece 1 comprises a connecting region 2. An attachment face 6 is designed opposed to the connecting region 2. A cross-section near the attachment face 6 is reduced compared to other regions. The contact piece 1 has an inner thread 8. Near the attachment face 6 the contact piece 1 has an external contour 3 which corresponds to a polygon in cross-section. Near the connecting region 2 the contact piece 1 is designed with a welded edge 12.

The device according to FIG. 3 comprises a stud 11 that is connected to the contact piece 1. The stud in this embodiment is designed as a screw. The screw is connected to the contact piece 1 via the inner thread 8. The screw comprises two end regions. One end region projects beyond the attachment face 6 of the contact piece 1 and is designed as a screw head. The screw head locks with the attachment face 6 and thus protects the attachment face 6 from welding and lacquer splashes. The other end region of the screw protrudes beyond the inner thread 8.

An orifice 4 of the contact piece 1 in the vicinity of the connecting region 2 is at least partially closed with a cap 9. The cap 9, made of plastics material, projects in the assembled state beyond the connecting region 2. The cap 9 is fastened on the open end region of the screw, which projects beyond the inner thread 8. The cap 9 comprises a flexible collar 10. This collar 10 contacts the outer face of the channel 7 peripherally. In this way the inner thread 8 is protected against environmental influences.

Figure 4:
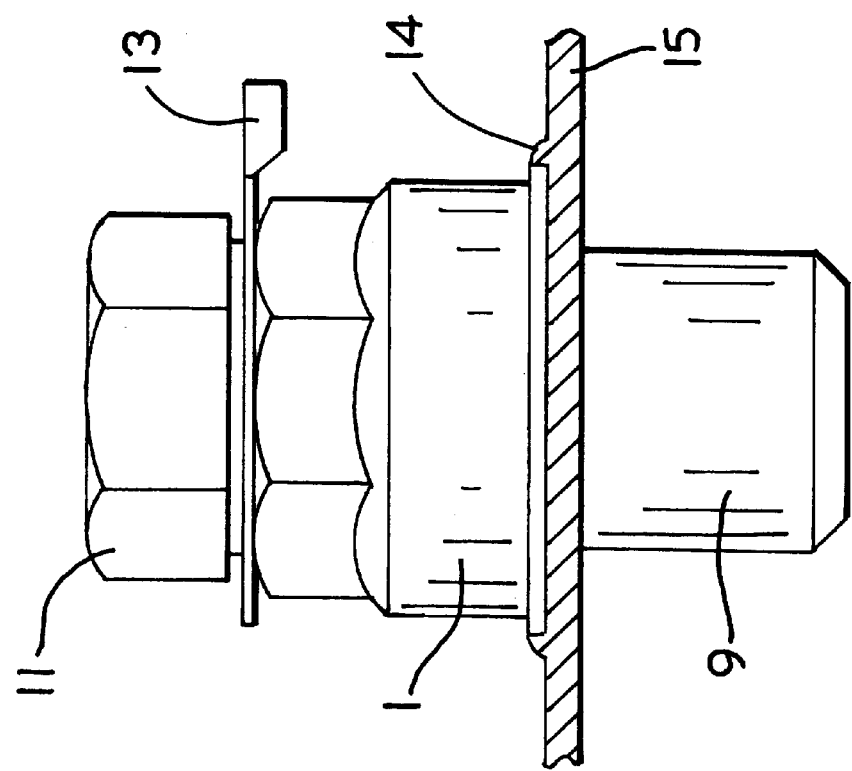
FIG. 4 shows an illustration of an embodiment in assembled state on a metal sheet.

FIG. 4 shows the embodiment according to FIG. 3 in the assembled state. The contact piece 1, the stud 11 and the cap 9 form a structural unit. This is fastened to a metal sheet 15 by the arc-stud welding process. The weld seam is denoted by 14. A cable lug 13 of an electrical conductor is fastened to the contact piece 1 with the stud 11, which in this embodiment is represented as a screw. The stud 11 is detached from the contact piece 1 while the cable lug 13 is fastened. If the mounting of the cable lug 13 requires removal of the stud 11, the cap 9 is also detached from the attachment device. After renewed mounting of the stud 11 the cap 9 is connected to the stud 11 again and thus protects the inner thread 8 from environmental influences.

In general, the above-identified embodiments are not to be construed as limiting the breadth of the present invention. It is understood that other modifications or other alternative constructions will be apparent which are within the scope of the invention as defined in the appended claims.

What is claimed is:

1. An attachment device for a workpiece (15), the attachment having a face (6) at one end and at the opposite end an annular flange extending radially inwardly a short distance over the top end of a peripheral groove (5) comprising:
   a. a contact piece (1) connected to the face (6);
   b. the contact piece (1) is in the form of a sleeve having an orifice (4) and defines a sheath;
   c. a cap (9) connected to the contact piece (1);
   d. the cap (9) is formed of a heat-resistant and electrically non-conducting plastic material;
   e. the cap (9) at least partially closes the orifice (4) adjacent to the connection with the contact piece (1) and projects outwardly therefrom;
   f. an attachment face (6) of the contact piece (1) is remote from the connection of the cap (9) to the contact piece (1) (at 2); and
   g. the contact piece (1) has a reduced cross-section in the vicinity of the attachment face (6).

2. The device claimed in claim 1 wherein:
   a. the contact piece (1) has an inner thread (8).

3. The device claimed in claim 2 wherein:
a. the contact piece (1) adjacent the attachment face (6) has an external contour (3) which corresponds to a polygon in cross-section.

4. The device claimed in claim 3 wherein:
a. the contact piece (1) adjacent the connection of the cap (9) to the contact piece (1) (at 2) has a welded edge (12).

5. The device claimed in claim 4 wherein:
a. the cap (9) is fastened to the contact piece (1) from inside.

6. The device claimed in claim 5 wherein:
a. the cap (9) is detachably connected to the contact piece (1).

7. The device claimed in claim 6 wherein:
a. the connection between the cap (9) and the contact piece (1) is a snap connection.

8. The device claimed in claim 7 wherein:
a. the contact piece (1) on the outer face of a channel (7) has a groove (5); and
b. the cap (9) has a corresponding collar (10) which engages the groove (5) of the contact piece (1).

9. The device claimed in claim 4 wherein:
a. a stud (11) of the device is connected to the contact piece (1), and has two end regions, wherein one end region projects beyond the attachment face (6) and the other end region is connected to the cap (9).

10. The device claimed in claim 9 wherein:
a. the stud has a head (16) which is adjacent to the attachment face (6).

11. The device claimed in claim 1 wherein:
a. an attachment face (6) of the contact piece (1) is remote from the connection of cap (9) to the contact piece (1) (at 2); and
b. the contact piece (1) has a reduced cross-section in the vicinity of the attachment face (6).

* * * * *